UNITED STATES PATENT OFFICE.

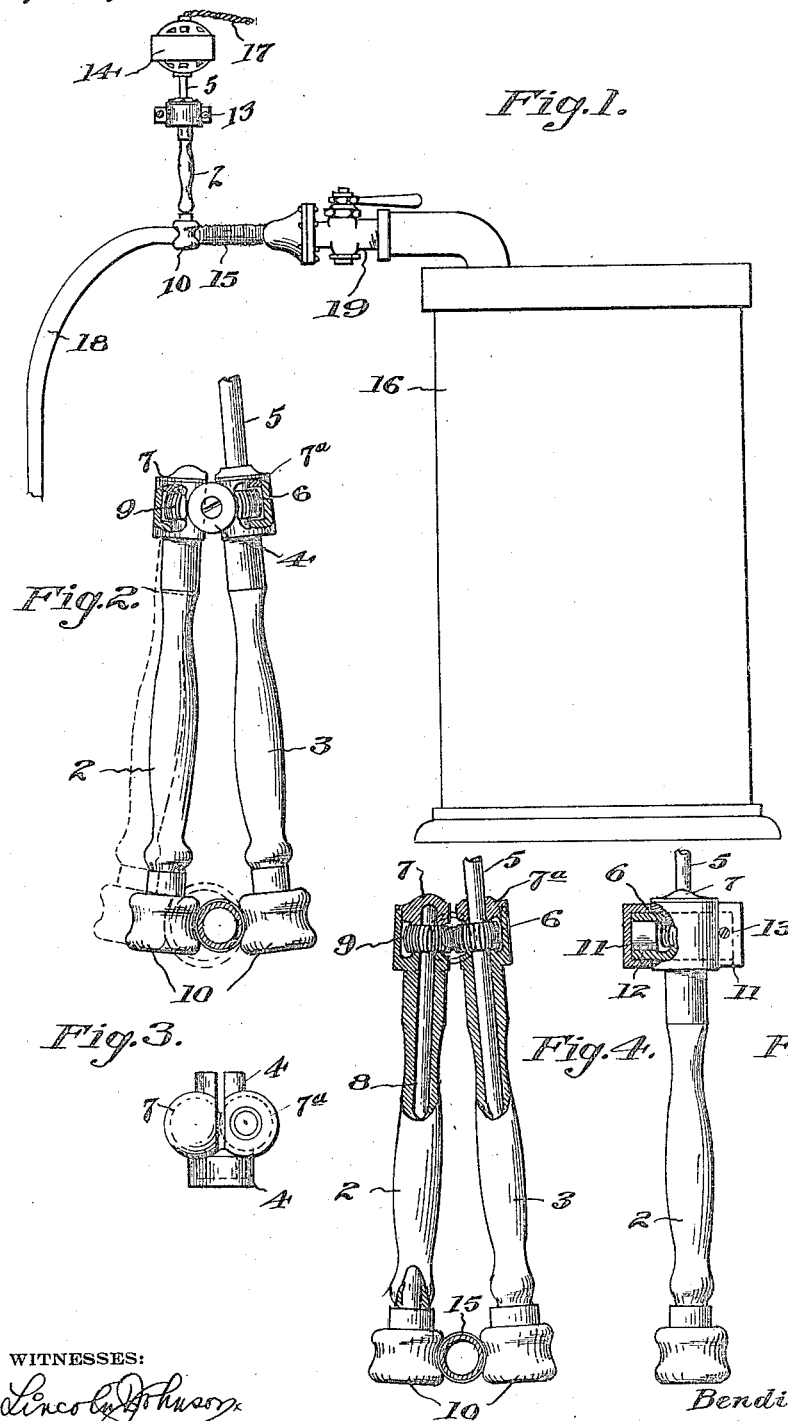

BENDIX MILLER, OF OAKLAND, CALIFORNIA, ASSIGNOR OF ONE-HALF TO C. A. BRIGHT, OF OAKLAND, CALIFORNIA.

CASING-FEEDER.

1,222,318.

Specification of Letters Patent.

Patented Apr. 10, 1917.

Application filed November 22, 1916. Serial No. 132,784.

*To all whom it may concern:*

Be it known that I, BENDIX MILLER, a citizen of the United States, residing at Oakland, in the county of Alameda and State of California, have invented new and useful Improvements in Casing-Feeders, of which the following is a specification.

This invention relates to a casing feeder. One of the objects of the present invention is to provide a simple, substantial, easily operated casing feeder which is adapted to be used in connection with sausage stuffers, and particularly a casing feeder which is adapted to be moved into or out of engagement with the discharging funnel or nozzle on the stuffer when the casing is applied. Further objects will hereinafter appear.

The invention consists of the parts and the construction and combination of parts as hereinafter more fully described and claimed, having reference to the accompanying drawings, in which—

Figure 1 is a side elevation of a stuffing machine, showing the application of the invention.

Fig. 2 is a side elevation of the casing feeder, partly in section.

Fig. 3 is a plan view of the handle sections, showing one of the hinge connections removed.

Fig. 4 is a view similar to Fig. 2, showing the upper ends of the handle members in section.

Fig. 5 is an end view of one of the handle members, partly in section.

A sausage in its finished state consists of meat (especially pork) minced and highly seasoned, which is inclosed in a cylindrical case or skin, usually made of the prepared intestine of some animal. The skins or casings into which the meat is forced are often sixty feet or more in length and it is now common practice to place the entire casing by hand on the funnel or nozzle of the stuffing machine before the actual filling or stuffing operation takes place. This hand-feeding operation does not only require skill and care on the part of the operator, but also involves the loss of considerable time, particularly when casings of small diameter are employed.

The purpose of the present invention is to overcome the above objections by providing a mechanical casing feed which is constructed and operated as follows: Referring to the drawings in detail, 2 and 3 indicate a pair of handle members which are secured at their upper ends by means of a hinge connection 4, hereinafter to be described. Extending through the handle section 3 is a driving shaft 5, and secured on said shaft, within the upper end of the handle member, is a crowned spur gear 6.

Mounted interiorly of the handle member 2 and journaled at the upper end in a cap 7 is a shaft 8, on which is secured a gear 9. This gear is also a crowned spur gear and as it intermeshes with the gear 6 a driving connection is formed whereby movement of the shaft 5 may be transmitted to the shaft 8. The shaft 8 and the shaft 5 extend through the lower end of the handle members 2 and 3 and are each provided with a rubber roller 10 having a shape substantially such as shown.

The hinge connection 4 securing the two handle members together and also permitting movement of one with relation to the other, as shown in Fig. 2, is constructed as follows: Formed on each side of each handle section is one-half of a hollow tubular projection. These tubular projections, when the handle members are brought together, form a continuous tubular member which is inclosed at each end by a bearing cap 11. Secured to each bearing cap is an inwardly projecting stud 12 which fits interiorly of the semicircular, tubular projections formed on the handle members. These studs are provided for the purpose of securing the bearing caps either to one semicircular, tubular section or the other by means of a set-screw 13 which passes through the cap, one semicircular, tubular section and the stud 12. These set-screws lock the bearing caps 11 from endwise removal and at the same time cause each cap member to turn with the handle member to which it is secured. The upper end of each handle is provided with a cap 7; the cap on the handle 2 forming a bearing for the upper end of the shaft 8 while the cap 7ª forms a bearing for the projecting end of the driving shaft 5.

The shaft 5 may be secured to an electric motor 14, or other suitable source of power. To permit the handle members to be raised and lowered with relation to the funnel 15 on the stuffing machine, generally indicated at 16, it is preferable to suspend the motor from a spring 17.

The operation of the casing feeder will be as follows: One end of a casing 18 is first pulled over the end of the funnel or nozzle 15. The handle members 2 and 3 are then grasped and pulled down into alinement with the nozzle. They are then squeezed together to assume the position shown in Fig. 2 where the rollers will engage the casing. The motor 14 may then be started, and as revolving movement is transmitted to the feeding rollers through the shafts 5 and 8 it can readily be seen that they will grasp the casing and pull it over the nozzle 15 until the entire length of the casing has been fed onto the nozzle. The entire casing here assumes a telescoped, compressed condition and is then ready for receiving the meat. The feeding action of the rubber rollers 10 is very positive and quick and it is, therefore, possible to place the entire casing, regardless of its length, upon the nozzle within a few seconds. This operation has heretofore always been accomplished by hand and, as previously stated, not only requires care and skill but also consumes considerable time, which in this instance, is entirely obviated. The end of the casing is now closed and the valve 19 opened. The stuffing of the casing may then be proceeded with in the usual manner.

The spring 17, whereby the motor, the handles 2 and 3 and the feeding rollers 10 are suspended, permits these to be raised or pulled out of the way while the stuffing operation takes place and also permits the operator to quickly pull the handle members, together with the rollers 10, down into engagement with the nozzle when a new casing is to be applied. It also permits the casing feeder as a whole to be moved into alinement with any nozzle where a plurality of the same are employed. While the spring 17 is here employed for the purpose specified, it is obvious that a telescoping shaft or any other suitable means might be employed.

The materials and finish of the several parts of the casing feeder may otherwise be such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In a sausage casing feeder, a pair of shafts having casing engaging rolls thereon, handles loosely surrounding the shafts, intermeshing crowned spur gears on the shafts, hollow projections on each handle formed to conjointly provide hollow cylindrical members which latter extend outwardly in diametrical relation to the handles, bearing caps inclosing the peripheries of the cylindrical members and having interior studs which project into the interiors of the respective hollow cylindrical members, a set screw for each cap extending through the cap, one of the projections and into the stud, a cap for each handle overlying the respective gears, one of the shafts projecting through the cap of its handle, and means to drive said shaft.

2. In a sausage casing feeder, a pair of shafts having casing engaging rolls thereon, handles loosely surrounding the shafts, intermeshing crowned spur gears on the shafts, hollow projections on each handle formed to conjointly provide hollow cylindrical members which latter extend outwardly in diametrical relation to the handles, bearing caps inclosing the peripheries of the cylindrical members and having interior studs which project into the interiors of the respective hollow cylindrical members, means to secure the caps in position, and means to drive one of the shafts.

3. In a sausage casing feeder, a pair of closely related handles adapted to be gripped by and held directly in the hands of the operator, a shaft loosely mounted in each handle, a casing engaging roll borne by each shaft, means to drive the shafts in unison, and means to pivotally connect the handles to allow same to approach or recede from one another as desired, by pressure exerted by the hands on or against the handles.

4. In a sausage casing feeder, a pair of closely related handles adapted to be gripped with and held directly in the hands of the operator, means borne by the handles to engage opposite sides of the casing to feed the latter, and means to actuate the feeding means.

5. In a sausage casing feeder, a plurality of adjustable means to engage opposite sides of the casing to feed the latter, means to actuate the feeding means, and manual means for enabling the feeding means to be supported in feeding position in the hands of the operator and adjusted to regulate the degree of engagement of each feeding means with the casing while so held.

In testimony whereof I have hereunto set my hand.

BENDIX MILLER.